United States Patent Office.

THOMAS HAWKS, OF ROCHESTER, NEW YORK.

*Letters Patent No. 78,875, dated June 16, 1868.*

IMPROVED CONCENTRATED MALT-EXTRACT.

*The Schedule referred to in these Letters Patent and making part of the same.*

TO ALL WHOM IT MAY CONCERN:

Be it known that I, THOMAS HAWKS, of the city of Rochester, in the county of Monroe, and State of New York, have invented a new and improved Product or Composition of Matter, which I term Concentrated Malt; and I hereby declare that the following is a full and exact description of said composition of matter, and of the method of producing it.

The object of my invention is to reduce by the best method of evaporation the infusion of malt to a state in which it is of much less bulk than the original article, and is a portable and merchantable commodity, and to do this in such a manner as not only to cause no deterioration in the peculiar qualities of the original ingredients, but to insure their preservation against the effects produced by time and incident to changes of climate and temperature.

The substance so produced may, it is conceived, be taken for any use of which the infusion of malt is susceptible, but it is chiefly designed for the ready and expeditious production of beer, ale, and other beverages, by the addition of water and yeast, and the infusion or extract of hops in suitable proportions, and subjecting to the proper temperature to produce fermentation.

I have devoted much time and expense in experiments to determine the best method of securing this result. I have tried different modes of evaporation, and have evaporated down to different degrees of consistency, from a thin liquid to nearly a solid state, and have practised various processes of making the evaporation.

I find evaporation *in vacuo* to be preferable to evaporation in the open air, for the follow reasons:

First. The evaporation of the aqueous portion of the infusion by the latter process takes place so slowly that fermentation sets in, injuring very perceptibly the properties of the malt before desiccation is effected.

Second. If the temperature be increased to make the evaporation more rapid, the high heat, in combination with the oxygen of the atmosphere, decomposes a portion of the saccharine matter as the infusion becomes dense, changing it into caramel, an inert product, incapable of vinous fermentation, and hence depriving beverages produced from it, in part of the sprightly effect and effervescence of alcohol and carbonic acid, and imparting a bitter, disagreeable flavor, and also discoloring it.

I also find that evaporation to a thickness or consistency greater than a heavy sirup or molasses, or of about the weight of eleven pounds to the gallon, wine-measure, is impracticable, for the following among other reasons:

When the infusion has been considerably reduced by evaporation, and has become thick and heavy, or of about the consistency above specified, the particles do not separate sufficiently fast to allow the steam, and, in consequence, the heat, to escape. This happens necessarily and inevitably without increasing the temperature specified in my description of process below. Consequently, even by the vacuum process, if evaporation be continued beyond the consistency herein stated, towards a more nearly solid state, the temperature of the mixture will be increased, and more or less of the saccharine matter will be burned, and thereby changed into a black, inert mass, incapable of passing properly through the vinous fermentation. From this, two noticeable results will follow: The beverages produced from the condensed substance will lack perceptibly the effervescent qualities which are essential to them, and will be more or less discolored. There is, moreover, great danger that in this attempt to reduce the mixture to a greater density than above specified, it will adhere to the heating surface, thereby producing, in a still greater degree, the injurious effects just described. This danger is so imminent that even under skillful management the adhesion would be likely to occur to some extent in a majority of instances. It would require also much longer time to make the evaporation to a solid state, for the evaporation proceeds more slowly as the substance increases in density. The difficulty of bringing the mixture to a solid state will be more apparent when it is considered that the saccharine matter in malt belongs to the class of grape-sugars, for which there is no known process of granulation, and that it requires the aqueous portion of it to be wholly expelled in order to bring it to a solid state, for these reasons, viz, the inevitable destruction of some portion of the effervescing or beer-making qualities of the mixture, and the great risk of still further injury from adhesion and the loss of time, it is inexpedient for practical purposes to carry the evaporation beyond the thickness of consistency herein stated, and hence evaporation to about that degree of density, and not to a solid state, is an essential and the controlling feature of my invention.

My process consists substantially in the following treatment:

An infusion of the malt is made by steeping with warm water (the temperature of which is 160° to 170° Fahrenheit, or thereabouts,) in a mash-tub of ordinary construction, which is drawn off, and fresh water supplied repeatedly, until the strength of the malt is fully extracted. This liquor is then placed in a wooden tub, preferably lined with copper, and boiled with steam, or in a vessel of copper or of other suitable material, and boiled over a fire. During the boiling, common salt may be added in the proportion of four or five pounds to fifty bushels of malt, and the liquor may be clarified with gelatine in the usual manner. During the process of boiling, at the option of the operator, cane-sugar may be advantageously added, in proportion adapted to the alcoholic strength desired for the article to be manufactured from the condensed extract, say from two to three pounds of sugar for every bushel of malt. The process of boiling will occupy from two to four hours, or until the liquor is thoroughly clarified, when it is drawn off into a receiving-vessel, which is connected with a vacuum-pan by a pipe or other suitable means, and as the air is exhausted from the pan, the infusion flows in to supply its place. It is then subjected, while *in vacuo*, to a temperature of 130° to 150° Fahrenheit, or thereabouts, for a sufficient length of time to bring it to the density or consistency of a heavy molasses, or ordinarily of such consistency that two gallons of it are produced from one bushel of malt. In this state, it is suitable for drawing off into kegs, or other vessels or packages, for preservation and transportation, as a portable and merchantable commodity, and adapted to any use of which the infusion of malt is susceptible. When required for use for the purposes of making ale or beer, dissolve it in water in the proportion, for ordinary beer or ale, of one part of the condensed substance to six or seven parts of water; add the infusion or extract of hops in suitable quantity; apply yeast, and subject the mixture to the usual process of fermentation, keeping it at the temperature, and managing it in all respects as in the ordinary manufacture of such malt liquors. The addition of cane-sugar is found to give an increased preservative quality and consequent durability to the preparation, and to add to the alcoholic properties of the beer with greater economy than could otherwise be done.

The gelatine aids in clarifying and thus improving the beer or ale during the subsequent process of fermentation, and also assists the vinous fermentation. It is also found to aid essentially in shielding the concentrated compound from any fermentation while in that condition, thus aiding cane-sugar in preserving the portable compound in an unchangeable state. On the other hand, when the composition is subsequently diluted with water raised to the proper temperature, and subjected to the action of yeast, the gelatine even promotes the vinous fermentation.

Ale and other beverages produced from the extract thus condensed possess a finer flavor and more lively and effervescent qualities than when brewed in the ordinary manner, and this is explained by the fact that the malt is preserved in greater perfection by evaporating the water which it contains at so low a temperature that it is not decomposed by the action of heat, and, air not being present during the process, the incipient fermentation is prevented from occurring, and thereby the saccharine and other fermentative properties remain unchanged in the condensed product.

I claim as a new product or composition of matter, the extract of malt, or, as I term it, concentrated malt, when condensed to a sirup or substance of thick consistency, substantially as herein described, either with or without the addition of cane-sugar, or with or without the addition of gelatine, substantially in the manner and for the purposes herein set forth.

In witness whereof, I have hereunto signed my name in the presence of two subscribing witnesses.

THOMAS HAWKS.

Witnesses:
  GEO. G. MUNGER,
  R. F. OSGOOD.